Oct. 31, 1944. M. H. BROSCHINSKI 2,361,596
WEED SHEDDING ATTACHMENT FOR ROD WEEDERS
Filed July 5, 1943
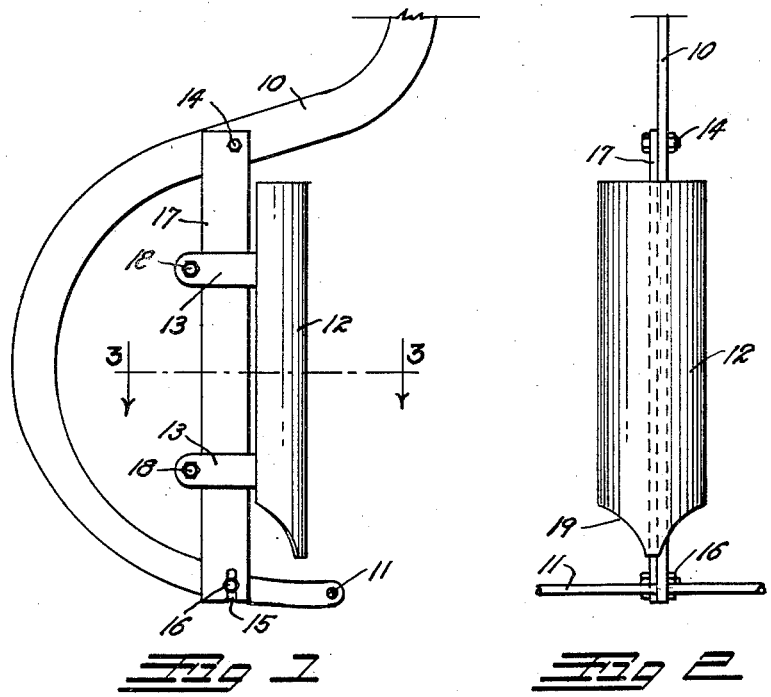
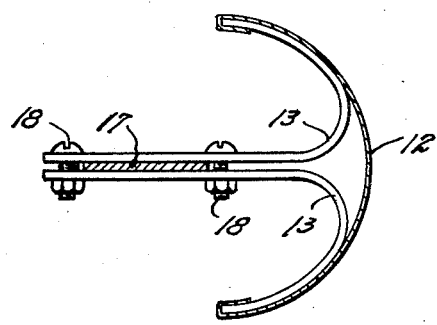
INVENTOR.
MARTIN H. BROSCHINSKI
BY Patented Oct. 31, 1944

2,361,596

UNITED STATES PATENT OFFICE 2,361,596

WEED SHEDDING ATTACHMENT FOR ROD WEEDERS

Martin H. Broschinski, Goodland, Kans.

Application July 5, 1943, Serial No. 493,618

4 Claims. (Cl. 97—42)

This invention relates to a weed guard for use on rod weeders. Rod weeders are implements for removing weeds by means of a horizontal rod which is forced transversely of its axis through the ground below the surface thereof, so as to engage the roots of the weeds and pull them from place. The rods of such weeders are supported from curved bracket arms extending at their lower extremities beneath the ground surface. One difficulty with weeders of this type results from these arms. The loosened weeds become draped across the arms, accumulating in piles which interfere with the weeding operation, tear up the ground, and increase the drag on the weeder.

The principal object of this invention is to provide a simple and efficient attachment which can be placed on the rod supporting arms of a rod weeder to deflect the weeds to either side thereof so that they will not be caught by the arms.

Another object of the invention is to provide an attachment of this character which will be adjustable so that when the machine is being used for deep weeding, it can be raised so as not to enter the ground and form a furrow therein.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side view of a typical rod weeder arm with the invention applied thereto.

Fig. 2 is a front view thereof.

Fig. 3 is an enlarged horizontal section taken on the line 3—3, Fig. 1.

In the drawing the bracket arm of a typical rod weeder is indicated at 10 supporting at its lower extremity, a weeder rod 11. The arm 10 is hook-shaped, that is, it extends first rearwardly from the frame of the machine, thence curves downwardly and forwardly to the weeder rod, as illustrated. The improved attachment is designed for attachment between the rearwardly extending upper portion of the curved arm and the forwardly extending lower portion thereof so as to be supported in a substantially vertical position thereon.

The attachment comprises a semi-cylindrical shield 12 of sheet metal or similar material. The side edges of the shield 12 are rolled inwardly over the extremities of curved bracket arms 13, there being a pair of these bracket arms adjacent the top and bottom of the shield. The bracket arms of each pair extend rearwardly in adjacent relation as shown in Fig. 3, so as to engage the opposite sides of a vertical supporting bar 17. The arms of each pair are clamped against the sides of the bar 17 by means of a pair of suitable clamp bolts 18.

The upper extremity of the supporting bar 17 is perforated to receive a suitable attachment bolt 14, by means of which it is secured to the upper reach of the bracket arm. The lower extremity of the supporting bar is notched, as shown at 15, to engage a second attachment bolt 16 on the lower reach of the bracket arm. When the bolts 18 are tightened, the shield is rigidly supported in the vertical position ahead of the bracket arm.

By providing a slot for the lower bolt, any differences in distance between the two bolts is automatically accommodated. The lower extremity of the shield is pointed as indicated at 19, so as to minimize any drag in the soil. By loosening the clamp bolts, the entire shield can be adjusted upwardly or downwardly, to suit the desired weeding depth.

In use, the loosened top soil flows to each side of the shield, and the weeds lying thereon are carried to the sides. Weeding is done before the weeds have attained much length. Therefore, due to the relatively wide rounded front on the shield, it is impossible for the weeds to hang thereover as they formerly did upon the bracket arms. Even the longer weeds do not become attached to the shield since the wide rounded arc of the latter does not break or bend the stalk thereof.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. An attachment for rod weeders of the type having a curved, rod-supporting bracket arm extending rearwardly at its upper portions and thence forwardly at its lower portion comprising a sheet metal shield secured between the upper and lower portions of the arm, said shield being curved about a vertical axis to present a rounded front face terminating in two vertical side edges.

2. An attachment for rod weeders of the type having a curved, rod-supporting bracket arm extending rearwardly at its upper portion and thence forwardly at its lower portion comprising: a vertical bar attached to and extending between the upper and lower portions of the arm, and a vertically positioned sheet metal shield supported by said bar forwardly thereof, said shield being curved about a vertical axis to present a rounded front surface.

3. An attachment for rod weeders of the type having a curved, rod-supporting arm extending rearwardly at its upper portion and thence forwardly at its lower portion comprising: a vertical bar attached to and extending between the upper and lower portions of the arm, and a vertically positioned shield supported by said bar forwardly said shield having a rounded forward face; and means for supporting said shield on said supporting bar at any desired vertical position thereon.

4. An attachment for rod weeders of the type having a curved, rod-supporting arm extending rearwardly at its upper portion and thence forwardly at its lower portion comprising: a sheet metal shield curved about a vertical axis to present a rounded front face terminating at the rear in two vertical side edges, the rearward vertical edges of said shield being rolled inwardly; a pair of bracket arms secured between the inwardly rolled edges at each side of said shield and extending rearwardly therefrom, the bracket arms at the opposite sides of the shield forming coacting pairs; a vertical supporting bar extending between the pairs of brackets; means for clamping the brackets of each pair against said bar; and means for securing the upper and lower extremities of said bar to the upper and lower portions, respectively, of said rod supporting arm.

MARTIN H. BROSCHINSKI.